March 19, 1957 W. T. DEHMER 2,785,668
CONVERTIBLE INTERNAL COMBUSTION ENGINE AND COMPRESSOR
Filed Nov. 5, 1954
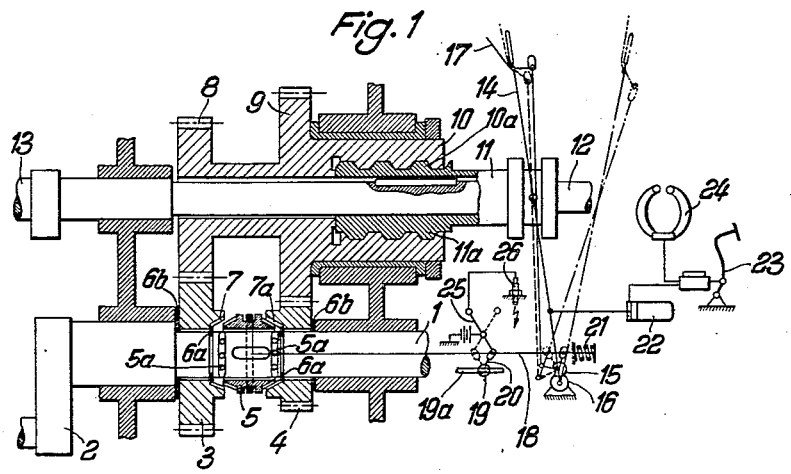
Fig. 1
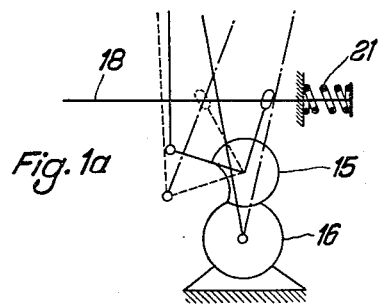
Fig. 1a
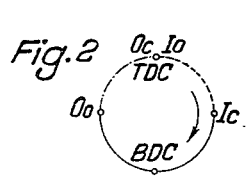
Fig. 2
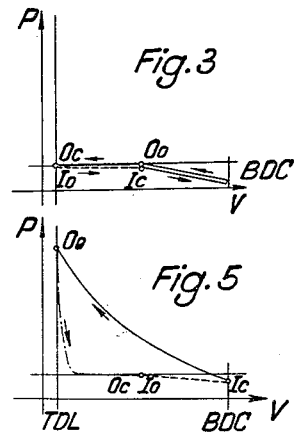
Fig. 3
Fig. 5
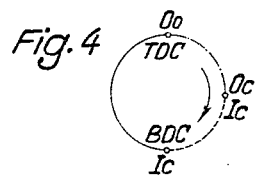
Fig. 4
Inventor:
Walter T. Dehmer
By
Patent Agent

United States Patent Office 2,785,668
Patented Mar. 19, 1957

2,785,668

CONVERTIBLE INTERNAL COMBUSTION ENGINE AND COMPRESSOR

Walter T. Dehmer, Essen, Germany, assignor to Aktiengesellschaft für Unternehmungen der Eisen- und Stahlindustrie, Essen, Germany Application November 5, 1954, Serial No. 467,106

Claims priority, application Germany November 11, 1953

11 Claims. (Cl. 123—97)

The present invention relates to four stroke cycle internal combustion engines and, more particularly, concerns a device for four-stroke cycle internal combustion engines, which have a control shaft driven by the crank shaft, for allowing selective operation of the engine as compressor. Primarily the device according to the invention is intended for engines of motor vehicles, because the possibility of using the engine, if desired, as motor brake, has gained increased importance during recent times. Due to the fact that with increased motor power, the load of street vehicles continually increases, it becomes more and more necessary to employ additional brakes for relieving the customary friction brakes.

Thus, for instance, devices have been employed as additional brakes for heavy motor vehicles, which additional brakes are designed as electric brakes in conformity with the principle of eddy current brakes. These braking devices are, however, relatively expensive and have not proved satisfactory because of the great difficulty to lead away the great heat quantities created during the braking operation.

In order to allow an increased braking by means of the motor which, when designed as four-stroke cycle engine, by itself acts as a brake during downhill driving within the lower velocity speeds, it has, for instance, been suggested to install throttle valves in the exhaust manifold of internal combustion engines. For purposes of braking, the said throttle valves are closed to cut off the supply of fuel, whereby a certain compression effect is produced in the individual cylinders. The effect of these exhaust brakes is, however, naturally relatively low.

In connection with four-stroke cycle internal combustion engines it is also known to employ special cam shafts which have two cam sets for each cylinder namely the ordinary inlet and outlet cams required for the operation of the engine and special braking cams. When operating such engine for purposes of braking while the fuel supply is shut off, the said cam shafts or the valve tappets are displaced in such a manner that the valve tappets cooperate with the braking cams. Aside from the fact that these cam shafts due to the multiplicity of the cams are rather expensive, these devices have furthermore the essential drawback that the displacement of the cam shaft from one pair of cams to the other pair of cams can from the designing standpoint be materialized only under great difficulties.

With engines in which the inlet and outlet cams are actuated by separate cam shafts, it is known, while the fuel supply is shut off, for purposes of braking to rotate the outlet cam shaft in such a manner that the engine acts as compressor. However, for quite some time, the design of the engine with two separate cam shafts has been abandoned in view of manufacturing difficulties and for economical reasons.

It has furthermore been suggested in connection with two-stroke cycle internal combustion engines having controlled discharge valves, to vary the control periods by angularly adjusting the control shaft in such a manner that the discharge valve will open either in or shortly ahead of the top dead center so that when the fuel supply is shut off, the engine will act as compressor. No difficulties are encountered with this type of motor to install the required adjusting devices for the control shaft later in already completed engines, which for instance is not possible without difficulties with four-stroke cycle motor braking devices having a displaceable cam shaft.

Trucks with two-stroke cycle engines provided with a braking arrangement as set forth in the preceding paragraph can safely be braked even on the greatest inclines. Such vehicles may, therefore, be driven with increased medium speed, which fact favorably influences the economy of the vehicle. The introduction of the suggested motor brake into practice, which brake for certain reasons of design have heretofore been employed only for vehicles with two-stroke cycle engines, also indicates the road to be followed in order to prevent many accidents which have their cause in the failure of the customary friction brakes.

It is, therefore, an object of the present invention to provide an improved control arrangement for use in connection with four-stroke cycle internal combustion engines, which, while being simple in construction and operation, will make it possible selectively to operate the engine as motor or as braking device.

It is another object of this invention to provide a control arrangement for use in connection with four-stroke cycle internal combustion engines, which can easily be installed in completed standard motor vehicle four-stroke cycle engines and will make it possible safely and selectively to operate the engine as motor or as brake, to thereby impart increased driving safety upon a motor vehicle equipped with a control arrangement according to the present invention.

These and other objects and advantages of the invention will appear more clearly from the following specification in connection with the accompanying drawings, in which:

Fig. 1 is a longitudinal section through a control arrangement according to the present invention.

Fig. 1a is an enlarged view of the locking device as shown in Fig. 1.

Fig. 2 represents a control diagram reflecting a certain control of the arrangement of the device according to Fig. 1.

Fig. 3 illustrates the braking graph pertaining to the control diagram of Fig. 2.

Fig. 4 is another control diagram reflecting another control of the arrangement of Fig. 1.

Fig. 5 represents the braking graph pertaining to the control diagram of Fig. 4.

General arrangement

The invention consists primarily in that in addition to the ordinary control shaft drive customary in connection with internal combustion engines, there is provided a second control shaft drive which may selectively be made effective or ineffective. When the said second control shaft drive is made effective, the control shaft rotates at the speed of the crank shaft, while the control shaft is connected with an adjusting device by means of which the opening of the discharge element may be varied within a range extending from the normal point of opening up to the range of the upper dead center point. As discharge elements, valves as well as rotary slide valves may be employed.

The two control shaft drives are, in conformity with the invention, selectively connected with their drive shaft by means of a clutch which establishes a connection between the crank shaft and the control shaft drive at a certain relative position only of the driving elements. This clutch may, for instance, be a jaw clutch in which the respective clutch members can engage each other only in a single certain relative position of the clutch members. In many instances it may be expedient to connect this clutch with a synchronizing device.

According to a further inventive feature, the clutch device between the two control shaft drives and the drive shaft therefor is connected with the adjusting device and the fuel supply in such a manner that when shifting the clutch from motor operation of the control shaft to braking operation, the fuel supply is automatically interrupted while simultaneously a lock for the adjusting device is released so that an operation of the adjusting device is possible only when the clutch of the control shaft drive is shifted to braking operation. The actuating device for the clutch may also additionally be connected with devices for making other means ineffective which are required for motor operation, for instance the ignition device. It may also be expedient when operating the engine as motor to turn the control shaft by a certain angle. This affords the possibility also within the motor range to vary the control periods of the engine, whereby in some instances increases in the power and decreases in the consumption of fuel may be obtained. According to the invention, as adjusting device for the control shaft there may be employed a device in which the control shaft is coupled to its drive in a manner known per se through the intervention of two adjusting elements interconnected by means of a thread, one of said adjusting elements being displaceable in axial direction during rotation. The sense of the thread is in a manner likewise known per se preferably so selected that the drive automatically returns the control shaft from the braking position into the position of motor operation. As adjusting elements of the adjusting device there may be employed a threaded sleeve longitudinally slidably mounted on the control shaft, which sleeve cooperates with a corresponding inner thread of the gear driving the control shaft. By displacing the threaded sleeve in axial direction, the control shaft is rotated by a certain angle relative to its drive in conformity with the axial displacement of the threaded sleeve. The braking effect increases with increasing angle of rotation and reaches its maximum value approximately when the discharge elements of the individual cylinders are opened at the time the pistons approximately reach their upper dead center point. The displacement of the threaded sleeve may also be mechanically effected from the driver's seat, for instance by a lever system or a worm or gear transmission. In many instances, however, it is advantageous to effect the displacement of the threaded sleeve by hydraulic or pneumatic means.

Structural arrangement

Referring now to the drawings in detail and Fig. 1 thereof in particular, the control arrangement shown therein comprises two gears 3 and 4 which are rotatably journalled on an extension 1 of the crank shaft 2. The gears 3, 4 are by means of rings 6a and slidable rings 6b held against displacement in axial direction and are adapted selectively by means of a clutch body 5 to be operatively connected with or disconnected from the crank shaft. The clutch body 5 which coacts with synchronizing rings 5a is designed as jaw or toothed clutch and acts in such a manner that a connection of the gears 3, 4 respectively with crank shaft 2 is possible only at a certain relative position of the respective gears and the crank shaft. This is made possible for instance by arranging the teeth of the clutch body 5 and of the clutch portion 7, 7a cooperating therewith and connected with the gears 3 and 4 respectively in an unsymmetric manner in such a way that always only the same teeth can engage each other. The gears 3, 4 in their turn respectively mesh with the gears 8, 9 both of which are connected to a sleeve 10 provided with an inner thread 10a. The thread 10a of sleeve 10 meshes with the thread 11a of a threaded sleeve 11. The sleeve 11 is longitudinally displaceably mounted on an extension 12 of the cam shaft or control shaft 13 but is prevented from rotating thereon. Operatively connected with the threaded sleeve 11 is a lever 14 by means of which the sleeve 11 can be displaced in axial direction whereby the cam shaft is rotated by a certain angle with regard to the driving wheels or gears therefor or with regard to the crank shaft. This angular range of adjustment extends from the normal opening start of the discharge valve up to an opening start of the latter at approximately upper dead center point. However, in some instances it may also be advantageous to be able to turn the cam shaft to such an extent that the discharge valve is opened only after the piston has passed through the upper dead center and has started its downward stroke. The lever 14 may, however, only be actuated when the clutch body 5 connects the crank shaft with the pair of gears 3, 8 and thus the control shaft rotates at the speed of rotation of the crank shaft. To this end, the lever 14 is connected with a locking device consisting of the locking discs 15, 16. The locking disc 15 is operatively connected with a handle 17 which latter is adapted to actuate the clutch body 5 by means of a rod system 18. When pulling the handle 17, the control disc 15 is so rotated that the control disc 16 is released whereby the possibility is created by actuation of the lever 14 and through the intervention of the threaded sleeve 11 and the sleeve 10 to rotate the control shaft 13 relative to the crank shaft 2. The clutch 5 is furthermore by means of a lever 20 connected with a closing member 19 provided in the fuel supply conduit 19a. This closing member 19 interrupts the supply of fuel when the clutch body 5 is shifted for braking operation. The rod system 18 provided between the locking disc 15 and the clutch body 5 is operatively connected with a spring 21 which returns the clutch body 5 into position for engine operation when the lever 14 and the handle 17 are returned to their starting positions.

The adjusting device for the control shaft may also be connected by mechanical or pneumatic means with the customary friction brakes of the vehicle and/or of the trailer. A connection of this kind is schematically represented in Fig. 1 where 22 indicates the hydraulic control of the adjusting device, and 23 designates the controlling device for the friction brakes 24. The friction brakes are actuated either by the controlling device 23, which is operatively connected to the brake pedal, or by the hydraulic control 22, which is operatively connected to the lever 14 of handle 17. Further, Fig. 1 shows schematically a device 25 for switching of the ignition 26.

The operation of the device shown in Fig. 1 is as follows:

When the engine is operated as motor, the clutch body 5 is connected with the corresponding cooperating clutch portion 7a of the gear 4 so that the crank shaft 2 drives the cam shaft 13 through the intervention of the gears 4, 9 at half the speed of the speed of rotation of the crank shaft. The closure member 19 within the fuel supply conduit 19a is opened and thus allows the supply of fuel to the engine.

For purposes of braking, the fuel supply is cut off and the engine is transformed into a compressor by pulling the handle 17 so that the clutch body 5 is brought into engagement with the corresponding cooperating clutch portion 7 of the gear 3. As a result thereof, the crank shaft 2 now drives the cam shaft 13 through the intervention of the gears 3 and 8 at the speed of rotation of the crank shaft. The clutch body 5 engages the corresponding cooperating clutch portion 7 of the gear 3 in a certain position only so that the crank shaft and the cam shaft can be brought into driving connection with each other only at a certain relative position thereof. After the gears 3 and 8 have been coupled to the crank shaft, the control diagram shown in Fig. 2 is obtained for a motor having a driving connection between the crank shaft and the cam shaft at a transmission ratio of 1:1. The inlet elements of the individual cylinders respectively open when the piston has reached upper dead center point and, considering that the crank shaft and the cam shaft rotate at a transmission ratio of 1:1, said inlet elements close when the piston has passed through half the downward stroke. When the piston moves further downwardly, the taken-in air volume expands until the piston has reached the lower dead center point. During the upward movement of the piston, compression occurs until after half the upward stroke of the piston, the discharge members open. The discharge members close at the upper dead center point as indicated in Fig. 3. A braking effect is not obtained in this position of the cam shaft.

Fig. 3 shows the pressure $p$ plotted over the piston stroke $v$ for a motor having its cam shaft and crank shaft rotate at a transmission ratio of 1:1. Starting from the opening point $Io$ of the inlet member, it will be seen that, with the piston moving downwardly, air is taken in at substantially even pressure until the closing point $Ic$ of the inlet member; at this point the piston has moved through half its downward stroke. The pressure then drops slightly up to the BDC point. The pressure then increases again up to the point $Oo$ where the outlet member opens. At this point the piston has passed through half its upward stroke. The pressure then remains substantially the same up to the point $Oc$ where the outlet member closes. This completes the cycle.

When an overlapping of the control periods of the inlet and outlet valves is provided, it may be expedient to provide a control member in the intake conduit which control member should act so that only an intake can be effected through the intake conduit while the discharge of compressed air through said intake conduit cannot be effected.

When pulling the handle 17, the locking disc 15 rotates in anti-clockwise direction with regard to Fig. 1a and thus unlocks the disc 16 so that the lever 14 connected to disc 16 can be moved. By pulling the lever 14, the cam shaft 13 is rotated relative to its drive by means of the threaded sleeve 11 and the sleeve 10 in such a manner that the discharge members will open later with regard to the control position shown in Fig. 2. Corresponding to the angular adjustment of the control or cam shaft, a more or less great braking effect is obtained which reaches its maximum value approximately when the lever 14 occupies the position shown in dot-dash lines. The diagram and graph pertaining to this position are illustrated in Figs. 4 and 5. In this connection, it will be observed that the discharge or outlet members open when the piston has reached upper or top dead center TDC and close when the piston has passed through half the downward stroke at $Oc$. Within the time period from TDC to $Oc$, the air that had been compressed in the cylinder during the upward stroke of the piston, is discharged so that the pressure in the cylinder equals the outer or atmospheric pressure. Simultaneously, the inlet members open and remain open until the piston has reached the bottom dead center point BDC so that the air is drawn into the cylinder. With reference to corresponding pressure-stroke graph of Fig. 5, it will be seen that the air volume taken in during the downward stroke of the piston is compressed during the upward stroke of the piston and is discharged from the cylinder when the discharge members open at the top dead center point. As a result thereof, an immediate pressure drop occurs in the cylinder while the piston is moving downwardly. When the pressure in the cylinder equals the outer or atmospheric pressure, the piston continuing its downward movement draws in air through the opened outlet elements.

In this connection, it may sometimes be expedient to provide a check valve in the discharge conduit so that air can be taken in only through the intake elements. In this way a soiling of the cylinder by an intake from the discharge conduit will be prevented.

Corresponding to the sense of the thread of the threaded sleeve 11, the drive has the tendency to return the lever 14 from the braking position into position for motor operation. When it is intended to return to motor operation, the driver has merely to shift the lever 14 into motor position. When releasing the handle 17, the clutch body 5 is again brought into engagement with the corresponding cooperating body 7a of the gear 4 so that the crank shaft due to the particularity of the clutch is brought into the correct position with the cam shaft for driving connection. Simultaneously the closure member 19 is again shifted to motor operation, and thus the fuel supply connection is again established.

It is, of course, understood that the present invention is, by no means, limited to the particular arrangement shown in the drawings but comprises any modifications within the scope of the appended claims.

What I claim is:

1. In combination with a four-stroke cycle internal combustion engine having a crank shaft and a cam shaft rotatable by said crank shaft: a first set of gears arranged for driving connection with each other and operable to effect driving connection between said crank shaft and said cam shaft at a step-down ratio of 2:1, a second set of gears arranged for driving connection with each other and operable to effect driving connection between said crank shaft and said cam shaft at a transmission ratio of 1:1, means drivingly connected with said crank shaft and operable selectively to effect driving connection of said crank shaft with said cam shaft either through said first set of gears or through said second set of gears, and control means operatively connected with said cam shaft and operable independently of a rotation of said crank shaft to rotate said cam shaft about its longitudinal axis by a predetermined angle.

2. In combination with a four-stroke cycle internal combustion engine having a crank shaft and a cam shaft rotatable by said crank shaft and provided with cam means operable to control the actuation of a control member for releasing gases to be discharged from the engine: a first pair of gears arranged for driving connection with each other and operable to effect driving connection between said crank shaft and said cam shaft at a step-down ratio of 1:2, a second pair of gears arranged for driving connection with each other and operable to effect driving connection between said crank shaft and said cam shaft at a transmission ratio of 1:1, clutch means drivingly connected with said crank shaft and operable selectively to effect driving connection of said crank shaft with said cam shaft either through said first pair of gears or through said second pair of gears, adjusting means arranged for effecting driving connection of said cam shaft with said first and second pairs of gears and operable independently of a rotation of said first and second pairs of gears to turn said cam shaft with said cam means about the longitudinal axis of said cam shaft by an angle ranging from the normal opening point of the engine when operating as motor to the top dead center point of said engine to thereby vary the opening and closing periods of said control members for selectively operating said engine as compressor.

3. In combination with a four-stroke cycle internal combustion engine having a crank shaft and a cam shaft rotatable by said crank shaft: a first pair of gears arranged for driving connection with each other and operable to effect driving connection between said crank shaft and said cam shaft at a step-down ratio of 2:1, a second pair of gears arranged for driving connection with each other and operable to effect driving connection between said crank shaft and said cam shaft at a transmission ratio of 1:1, clutch means arranged for driving connection with said crank shaft and operable selectively to establish driving connection between said crank shaft and either one of said pairs of gears, said clutch means being arranged to establish driving connection between said crank shaft and the adjacent gear of either one of said pairs of gears at a predetermined relative position only of said crank shaft and the respective adjacent gear of either one of said pairs of gears.

4. An arrangement according to claim 3, in which said clutch means is designed as a clutch equipped with teeth for selectively engaging corresponding teeth in the adjacent gear of said first or of said second pair of gears.

5. In combination with a four-stroke cycle internal combustion engine having a crank shaft and a cam shaft rotatable by said crank shaft: a first pair of gears arranged for driving connection with each other and operable to effect driving connection between said crank shaft and said cam shaft at a step-down ratio of 2:1, a second pair of gears arranged for driving connection between said crank shaft and said cam shaft at a transmission ratio of 1:1, each of said pairs of gears having one gear normally rotatably mounted on said crank shaft and provided with a clutch element, a clutch body drivingly connected to said crank shaft and movable selectively into driving engagement with the clutch member of either one of the gears normally rotatable about said crank shaft, synchronizing means operatively connected with said clutch member and said clutch elements for selectively synchronizing the speed of rotation of the respective gear on said crank shaft with the speed of rotation of said clutch member, and control means operatively connected with said cam shaft and operable to rotate said cam shaft by a predetermined angle independently of a rotation of said crank shaft.

6. In combination with a four-stroke cycle internal combustion engine having a crank shaft and a cam shaft rotatable by said crank shaft: a first pair of gears arranged for driving connection with each other and operable to effect driving connection between said crank shaft and said cam shaft at a step-down ratio of 2:1, a second pair of gears arranged for driving connection with each other and operable to effect driving connection between said crank shaft and said cam shaft at a transmission ratio of 1:1, clutch means drivingly connected to said crank shaft and operable selectively to effect driving connection of said crank shaft with said cam shaft through either one of said pairs of gears, adjusting means operatively connected with said cam shaft and operable independently of a rotation of said crank shaft to adjust said cam shaft about its longitudinal axis by a predetermined angle, fuel delivery conduit means for conveying fuel to said engine, and throttling means arranged within said conduit means and operatively connected with said adjusting means so as automatically to be turned in closing direction in response to the adjustment of said cam shaft independently of said crank shaft in a predetermined direction.

7. In combination with a four-stroke cycle internal combustion engine having a crank shaft and a cam shaft rotatable by said crank shaft: a first pair of gears arranged for driving connection with each other and operable to effect driving connection between said crank shaft and said cam shaft at a step-down ratio of 2:1, a second pair of gears arranged for driving connection with each other and operable to effect driving connection between said crank shaft and said cam shaft at a transmission ratio of 1:1, clutch means drivingly connected to said crank shaft and operable selectively to effect driving connection of said crank shaft with said cam shaft through either one of said pairs of gears, adjusting means operatively connected with said cam shaft and operable independently of a rotation of said crank shaft to adjust said cam shaft about its longitudinal axis by a predetermined angle, ignition means associated with said engine for effecting ignition of the charge in said engine when said cam shaft is driven by said crank shaft through said first pair of gears, and means operatively connecting said ignition means with said clutch means and operable automatically to interrupt the operation of said ignition means in response to the actuation of said clutch means for driving said cam shaft by said crank shaft through said second pair of gears.

8. In combination with a four-stroke cycle internal combustion engine having a crank shaft and a cam shaft rotatable by said crank shaft: a first pair of gears arranged for driving connection with each other and operable to effect driving connection between said crank shaft and said cam shaft at a step-down ratio of 2:1, a second pair of gears arranged for driving connection with each other and operable to effect driving connection between said crank shaft and said cam shaft at a transmission ratio of 1:1, clutch means drivingly connected with said crank shaft and movable selectively into a first position for effecting driving connection of said crank shaft with said cam shaft through said first pair of gears or into a second position for effecting driving connection of said crank shaft with said cam shaft through said second pair of gears, adjusting means operatively connected with said cam shaft and operable independently of a rotation of said crank shaft to rotate said cam shaft by a predetermined angle, and locking means operable automatically in response to the movement of said clutch means for establishing driving connection between said crank shaft and said cam shaft through said first pair of gears for locking said adjusting means in a predetermined position relative to those gears of said pairs of gears which are adjacent said cam shaft, said locking means also being arranged for automatically releasing said adjusting means in response to the movement of said clutch means for effecting driving connection between said crank shaft and said cam shaft through said second pair of gears.

9. In combination with a four-stroke cycle internal combustion engine having a crank shaft and a cam shaft rotatable by said crank shaft; first high pitch threaded sleeve means rotatably connected to said cam shaft but axially displaceable thereon, a first gear supported by and rotatable about said crank shaft, a second gear meshing with said first gear, a third gear supported by and rotatable about said crank shaft, a fourth gear meshing with said third gear, clutch means associated with said crank shaft and operable selectively to effect driving connection of either one of said first and third gears with said crank shaft, second sleeve means connected to said second and fourth gears and provided with a high pitch thread meshing with the high pitch thread of said first sleeve means, bearing means supporting said second sleeve means and preventing axial displacement thereof, and actuating means for rotating the thread of said first sleeve means in the thread of said second sleeve means to thereby rotationally adjust said cam shaft independently of a rotation of said crank shaft from a first position for normal engine operation into a second position for operating the engine as compressor.

10. An arrangement according to claim 9, in which the sense of the thread of said first and second sleeve means is so directed that the cam shaft has the tendency automatically to return from said second position into said first position.

11. An arrangement according to claim 9, which includes power operable means for operating said actuating means.

(References on following page)

References Cited in the file of this patent

UNITED STATES PATENTS

| | | |
|---|---|---|
| 808,210 | Palmbla | Dec. 26, 1905 |
| 1,036,321 | Pembroke | Aug. 20, 1915 |
| 1,527,456 | Woudt et al. | Feb. 24, 1925 |
| 1,861,534 | Kazenmaier | June 7, 1932 |
| 2,057,354 | Withers et al. | Oct. 13, 1936 |
| 2,178,152 | Walker | Oct. 31, 1939 |
| 2,191,459 | Duncan | Feb. 27, 1940 |
| 2,297,376 | Walker | Sept. 29, 1942 |
| 2,705,480 | Cambeis et al. | Apr. 5, 1955 |

FOREIGN PATENTS

| | | |
|---|---|---|
| 594,737 | Germany | Mar. 22, 1934 |